US011414000B2

(12) United States Patent
Brown et al.

(10) Patent No.: US 11,414,000 B2
(45) Date of Patent: Aug. 16, 2022

(54) SELF-LEVELING SINGLE AXLE DUMP TRUCK

(71) Applicant: LIEBHERR MINING EQUIPMENT NEWPORT NEWS CO., Newport News, VA (US)

(72) Inventors: Joshua Brown, Norfolk, VA (US); Hunter Bates, Portsmouth, VA (US)

(73) Assignee: LIEBHERR MINING EQUIPMENT NEWPORT NEWS CO., Newport News, VA (US)

( * ) Notice: Subject to any disclaimer, the term of this patent is extended or adjusted under 35 U.S.C. 154(b) by 301 days.

(21) Appl. No.: 16/886,629

(22) Filed: May 28, 2020

(65) Prior Publication Data

US 2020/0391642 A1    Dec. 17, 2020

Related U.S. Application Data

(60) Provisional application No. 62/953,164, filed on Dec. 23, 2019, provisional application No. 62/859,984, filed on Jun. 11, 2019.

(51) Int. Cl.
  *B60P 1/04* (2006.01)
  *B60P 1/16* (2006.01)
  *B60P 1/28* (2006.01)

(52) U.S. Cl.
  CPC .............. *B60P 1/045* (2013.01); *B60P 1/16* (2013.01); *B60P 1/283* (2013.01)

(58) Field of Classification Search
  CPC ..................................................... B60P 1/045
  USPC .......... 298/17 S; 414/352; 405/116, 38, 240, 405/50
  See application file for complete search history.

(56) References Cited

U.S. PATENT DOCUMENTS

| 4,806,043 | A | * | 2/1989 | Fournier | E02F 5/104 210/170.07 |
| 5,476,285 | A | * | 12/1995 | Dickerson | B60G 9/02 280/124.132 |
| 5,915,878 | A | * | 6/1999 | Carpenter | E02F 5/102 405/38 |
| 5,975,804 | A | * | 11/1999 | Bockman | E02F 5/102 37/367 |
| 2006/0056917 | A1 | * | 3/2006 | McCormick | E02F 5/101 405/116 |

(Continued)

FOREIGN PATENT DOCUMENTS

WO    2019075002 A1    4/2019
WO    2020229873 A1    11/2020

OTHER PUBLICATIONS

ISA European Patent Office, International Search Report and Written Opinion Issued in Application No. PCT/EP2020/065942, dated Oct. 12, 2020, WIPO, 15 pages.

*Primary Examiner* — D Glenn Dayoan
*Assistant Examiner* — Sunsurraye Westbrook
(74) *Attorney, Agent, or Firm* — McCoy Russell LLP

(57) ABSTRACT

A self-leveling single axle dump truck is provided, the truck comprising a frame, a dump body pivotably mounted on the frame, and a propulsion and self-leveling system comprising a single axle supporting the frame at least during motion of the self-leveling single axle dump truck, the single axle comprising at least a first and a second wheel and at least a first electric traction motor for driving the first wheel and a second electric traction motor for driving the second wheel.

29 Claims, 13 Drawing Sheets

(56) References Cited

U.S. PATENT DOCUMENTS

| | | |
|---|---|---|
| 2009/0041564 A1 | 2/2009 | Borntrager et al. |
| 2012/0130578 A1* | 5/2012 | Whitfield ................ B60L 50/10 298/17 R |
| 2018/0093706 A1 | 4/2018 | Nguyen et al. |
| 2018/0345952 A1 | 12/2018 | Layfield et al. |

* cited by examiner

S1: driving the self-leveling single axle dump truck by controlling the first electric traction motor and the second electric traction motor to generate a driving torque S2: self-leveling the self-leveling single axle dump truck by generating a self-leveling torque that is combined with the driving torque S3: steering the self-leveling single axle dump truck by controlling the first electric traction motor and the second electric traction motor to generate wheel speed differentials between the first wheel and the second wheel

FIG. 12

S4: driving the self-leveling single axle dump truck, the single axle dump truck supported only on the single axle S5: stopping the self-leveling single axle dump truck S6: lowering support legs into at least one support position where they at least partly support the chassis S7: at least one out of loading the single axle dump truck by filling the dump body and un-loading the single axle dump truck by hoisting the dump body

FIG. 13

S8: driving the single axle dump truck from a loading location to a dumping position in a first driving direction by controlling the first electric traction motor and the second electric traction motor to rotate in a first angular direction S9: stopping the single axle dump truck S10: un-loading the single axle dump truck by hoisting the dump body S11: driving the single axle dump truck from the dumping position to the loading position in a second driving direction by controlling the first electric traction motor and the second electric traction motor to rotate in a second angular direction opposite to the first angular direction

FIG. 14

S12: receiving a mission from a central mission controller

S13: autonomously controlling the single axle dump truck along the mission

FIG. 15

SELF-LEVELING SINGLE AXLE DUMP TRUCK

CROSS REFERENCE TO RELATED APPLICATIONS

The present application claims priority to U.S. Provisional Application No. 62/953,164 entitled "A SELF-LEVELING SINGLE AXLE DUMP TRUCK," and filed on 23 Dec. 2019, and to U.S. Provisional Application No. 62/859,984 entitled "A SELF-LEVELING SINGLE AXLE DUMP TRUCK," and filed on 11 Jun. 2019. The entire contents of the above-listed applications are hereby incorporated by reference for all purposes.

FIELD OF THE INVENTION

The present invention relates to trucks, in particular to dumper trucks, such as off road dumper trucks as used in mines or on-road or off-road dumper trucks as used in earth moving applications.

BACKGROUND ART

Conventional dumper trucks comprise a frame supported on at least two axles. At least the front axle comprises a steering system for changing a steering angle of the front wheels. At least a rear axle comprises a propulsion system, such as an electrical traction motor.

Conventional dumper trucks are provided with a cabin, from where a driver will control the truck. Some dumper trucks have additionally been provided with an autonomous mode.

BRIEF SUMMARY OF THE INVENTION

An object of the present invention is to provide an improved concept for a dumper truck, in particular for an on road or off road dumper truck. Objects may include a higher operating efficiency, higher productivity, reduced maintenance costs, reduced cost per ton and reduced complexity.

These and other objects may be solved by embodiments of the present disclosure.

The present disclosure provides concepts for a single axle self-leveling truck.

In an aspect, the truck may have a single axle and the loaded mass may be suspended above the axle. The concept may be based on an inverted pendulum design with controls suitable for maintaining stability. The inherent reduction of components and structures needed to bridge two axles may provide a high payload to empty vehicle weight (EVW) ratio and result in a higher operating efficiency, higher productivity, reduced maintenance costs, and reduced cost per tonne. Further, complexity may be reduced.

In an aspect, steering may be accomplished by wheel speed differentials. As a result the truck may have a zero turn radius for maneuverability and efficiency. Elimination of steering components conventionally needed for trucks may reduce cost, weight and complexity.

In an aspect, the truck may travel in either direction without preference to minimize maneuvering and time needed during a haul cycle during normal operation.

In an aspect, a method of stabilizing a single axle self-leveling truck may be provided utilizing hydraulically or electrically actuated support legs to ensure the truck remains upright when needed. These legs do not require energy once deployed, can improve efficiency, and reduce operating costs of the truck.

In an aspect, the truck may be a dumper truck comprising a dump body pivotably mounted on a frame. Hoisting of the dump body may be accomplished using a hydraulic hoist cylinder arrangement.

In an aspect, the truck may be powered by numerous sources of energy including diesel, electrochemical energy storage, capacitors, trolley, and others or combinations of these.

In an aspect, the truck may be autonomously controlled, and features related to the operator and operator's comfort may be removed along with at least one out of steering components, suspension components, and main frame components which traditionally span the two or more axles. This may create a more simple design that costs less, requires less maintenance, has faster haul cycles, higher payload, more productivity and subsequently a lower cost per ton.

An autonomously controlled truck may use a predefined trajectory to move from a start position to an end position. A vehicle control system may be provided that identifies the current position of the truck and controls the truck along the predefined trajectory.

DETAILED DESCRIPTION OF THE INVENTION

Figure 1:
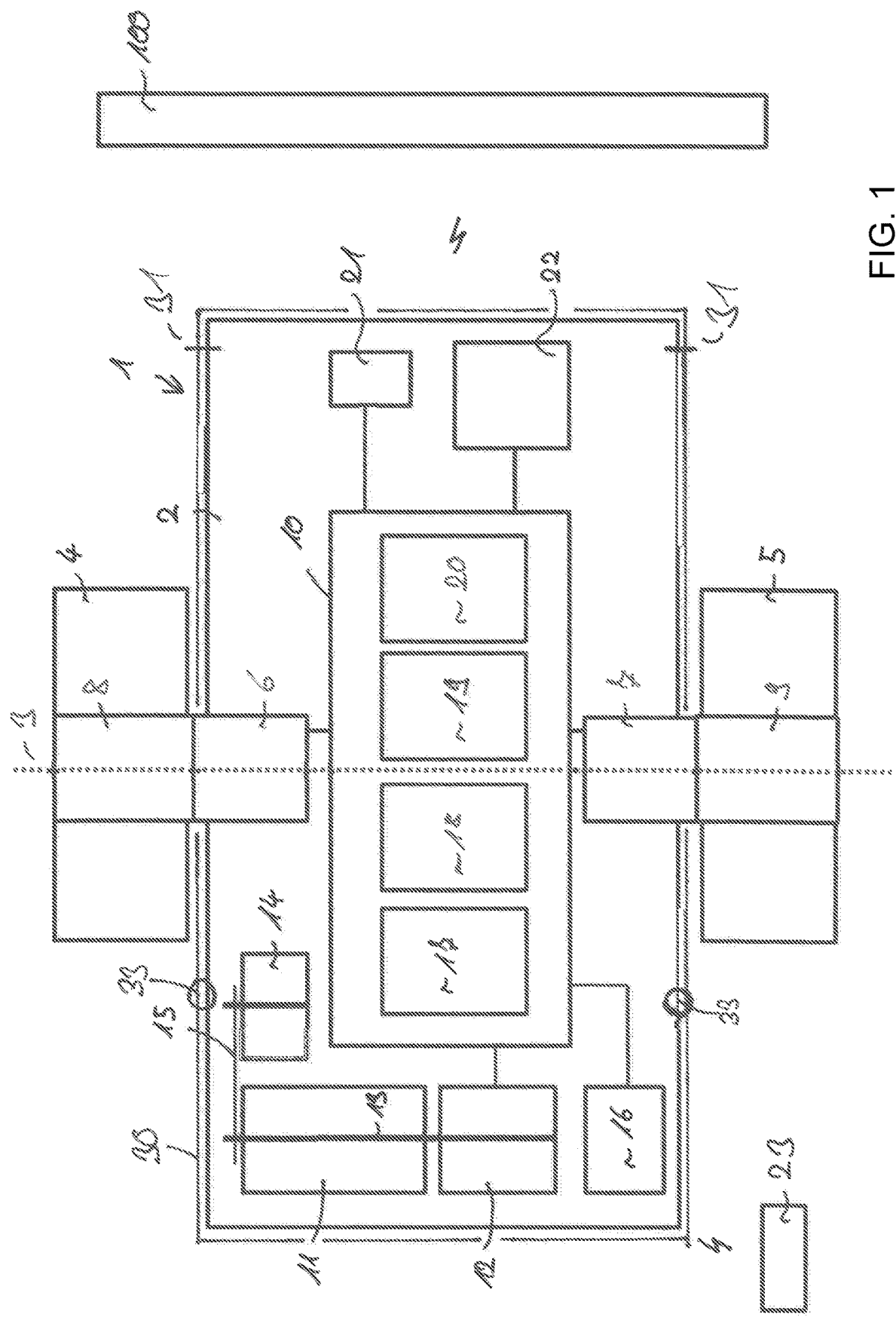
FIG. 1 is a schematic drawing showing functional parts of an embodiment of a truck.
Figure 2:
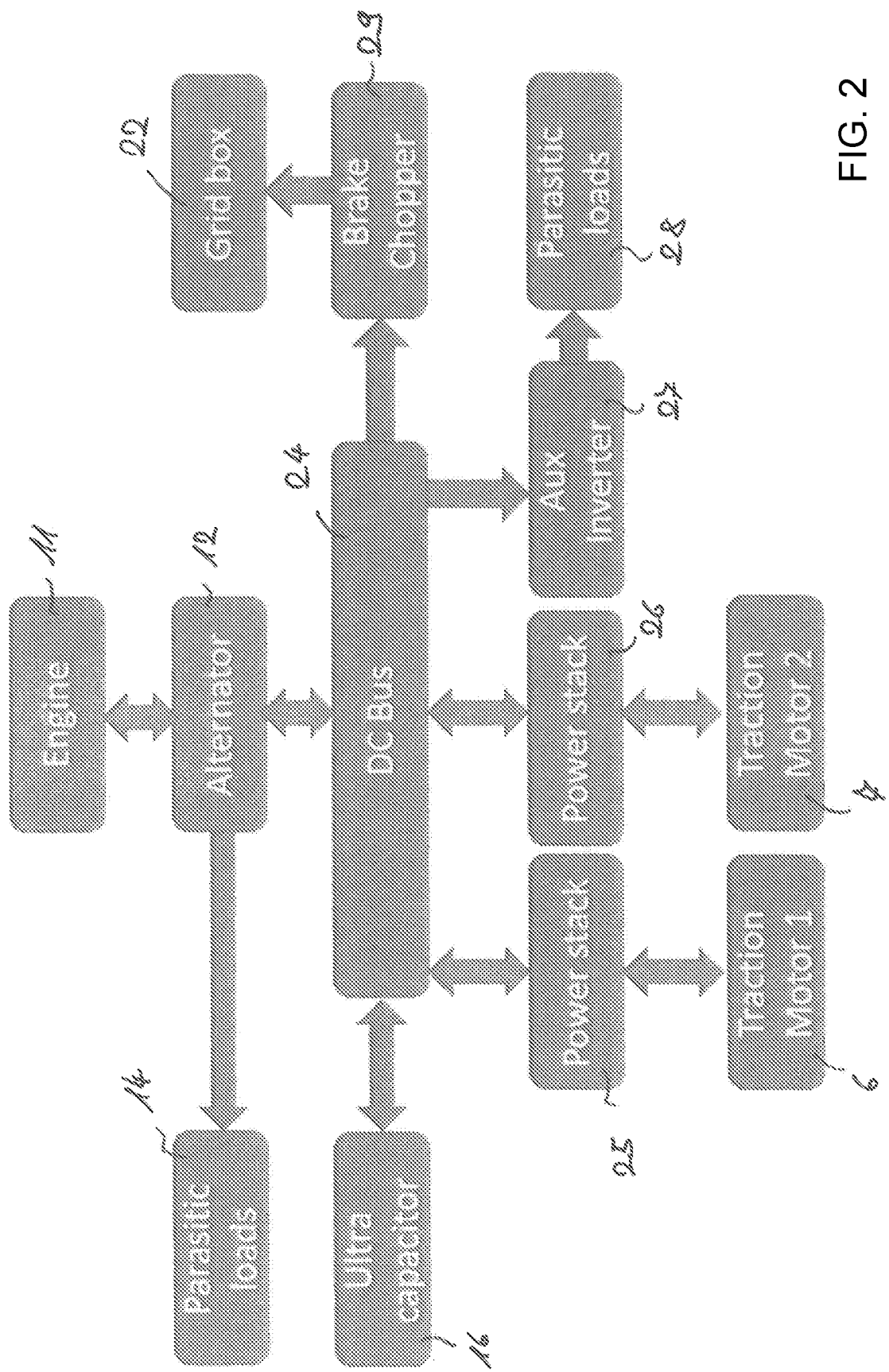
FIG. 2 is a schematic drawing of a control system of an embodiment of a truck.

FIGS. 1 and 2 shows functional parts of an embodiment of a self-leveling single axle dump truck 1 and a control system for such a dump truck in a schematic drawing. FIGS.

3 to 11 show mechanical constructional aspects of an embodiment of a self-leveling single axle dump truck 1.

The self-leveling single axle dump truck 1 may comprise a frame 2 and a dump body 30 pivotably mounted on the frame 2. In particular, the dump body 30 may be arranged on the frame 2 with a horizontal pivot axis 31. Dump body 30 may be filled with material schematically shown as heap 74. Hoisting of the dump body 30 may be accomplished by at least one hoisting actuator 33. By hoisting the dump body, material contained in the dump body may be made to slide out of the dump body. In an embodiment, for hoisting of the dump body 30, at least one hydraulic cylinder 33 may be provided.

The self-leveling single axle dump truck 1 may further comprise a propulsion and self-leveling system comprising a single axle 3 supporting the frame 2 at least during motion of the self-leveling single axle dump truck 1, the single axle 3 comprising at least a first wheel 4 and a second wheel 5 and at least a first electric traction motor 6 for driving the first wheel 4 and a second electric traction motor 7 for driving the second wheel 5. The mass of the self-leveling single axle dump truck 1 may be suspended above the single axis both in an empty condition and in a loaded condition.

In an embodiment, the self-leveling single axle dump truck 1 may further comprise a steering control system 19 configured to control the first electric traction motor 6 and the second electric traction motor 7 and to steer the single axle dump truck 1 by wheel speed differentials between the first wheel 4 and the second wheel 5.

In an embodiment, the steering control system may be configured to control the first electric traction motor and the second electric traction motor to turn in opposite rotational directions.

In an embodiment, the self-leveling single axle dump truck 1 may further comprise a self-leveling control system comprising a sensor 21 and a controller 20 configured to control the first electric traction motor 6 and the second electric traction motor 7 and to level out the single axle dump truck 1 in a balance position by controlling the first electric traction motor 6 and the second electric traction motor 7 in dependence on a signal received from the sensor 21. In an embodiment, the sensor 21 may be one or a combination of several out of the following sensors: accelerometer, inclinometer, magnetometer, gyroscope, rotary encoder for wheel angular velocity and position, radar/LIDAR for ground sensing, GPS for heading/speed/position, pressure transducers for measuring payload, linear encoders for measuring support leg position, autonomous control related sensors. In an embodiment, the sensor may be an inertial measuring unit (IMU).

In an embodiment, the controller 20 may be a microcomputer, including a microprocessor unit, input/output ports, an electronic storage medium for executable programs (e.g., executable instructions), and non-transitory read-only memory. The controller may be coupled to various components of the vehicle system via a communication channel or data bus.

In an embodiment, the controller 20 of the self-leveling control system may be configured to process a sensor output of the sensor 21 to determine an inclination of the self-leveling the single axle dump truck, and to control the first electric traction motor 6 and the second electric traction motor 7 to maintain the inclination at a desired inclination.

The desired inclination may be a balanced inclination determined by the self-leveling the single axle dump truck in dependence on a load distribution on the self-leveling the single axle dump truck. In particular, the balanced inclination may be determined such that the center of gravity is located above the single axle to maintain the single axle dump truck in a balanced state. The load distribution may vary during operation of the vehicle, such that the balanced inclination may equally vary. This may be due to an imbalanced loading of the dump body of the truck with material. During empty operation, the load distribution may change with debris collecting on the truck, material remaining in the dump body after a dump operation because it is stuck in the dump body, or fuel usage.

The balanced inclination may be determined based on wheel angular velocity and/or other sensor data, such as load cells on the dump body for determining a loading condition of the dump body. The vehicle control system may control the first electric traction motor 6 and the second electric traction motor 7 to maintain the inclination at the balanced inclination if no angular acceleration around the single axle is required.

The maximum balanced inclination allowed by the vehicle control system may be above 2 degrees in both directions, above 4 degrees in both directions, or above 5 degrees in both directions. The maximum balanced inclination allowed by the vehicle control system may be below 20 degrees in both directions, below 12 degrees in both directions, or below 8 degrees in both directions.

The desired inclination may further be an acceleration inclination determined by the self-leveling the single axle dump truck based on an angular acceleration of the single axle required for accelerating the single axle dump truck and/or driving the self-leveling the single axle dump truck on a ground having a grade. In particular, if an angular acceleration around the single axle is required, the acceleration inclination may be determined such that the center of gravity is located in front or behind the single axle, in order to generate an angular acceleration around the single axle that counteracts the angular acceleration generated by the traction motors for accelerating the single axle dump truck and/or driving the self-leveling the single axle dump truck on a ground having a grade.

The maximum acceleration inclination allowed by the vehicle control system may be above 10 degrees in both directions, above 15 degrees in both directions, or above 20 degrees in both directions. The maximum acceleration inclination allowed by the vehicle control system may be below 40 degrees in both directions, below 35 degrees in both directions, or below 30 degrees in both directions.

In an embodiment, the self-leveling control system may be configured to control the first electric traction motor and the second electric traction motor such that the inclination of the single axle dump truck varies in dependence on at least one out of an acceleration of the self-leveling single axle dump truck and a grade of a ground traversed by the self-leveling single axle dump truck.

In an embodiment, the self-leveling control system may be configured such that the dump truck leans forward in a driving direction on positive acceleration and backwards against a driving direction on breaking.

In an embodiment, the self-leveling control system may be configured such that the dump truck, when traversing a ground having a grade, leans towards a direction of positive grade, i.e. towards a hill side.

In an embodiment, the self-leveling single axle dump truck 1 may further comprise a control system 10 for controlling the single axle dump truck 1 in an autonomous mode.

In an embodiment, the control system 10 may be configured to remotely communicate with a central mission controller 100 to receive a mission and to autonomously control the single axle dump truck 1 along the mission.

In an embodiment, the frame may be configured without a cabin for the driver. Therefore, in operation, the single axle dump truck 1 may always operate in an autonomous mode or by tele-operation.

In an embodiment, the self-leveling single axle dump truck 1 may further comprise support legs 34 arranged on the frame and at least an actuator 36 for lowering the support legs into at least a first support position where they at least partly support the frame 2, and for raising the support legs 34 into at least one drive position where the frame 2 is only supported by the single axle 3.

In an embodiment, the actuator 36 may be configured to lower the support legs 34 into a second support position where at least one of the first wheel 4 and second wheel 5 of the single axle 3 is lifted off ground.

In an embodiment, the at least one actuator 36 may comprise a locking bracket 37 for mechanically locking the support legs 34 in at least one support position. The actuator 36 may for example be a hydraulic actuator or an electric actuator.

In an embodiment, the self-leveling single axle dump truck 1 may further comprise a control system 18 for controlling the at least one actuator 36, the control system 18 being configured to vary a height position of the support legs 34 during driving.

In an embodiment, the control system for controlling the at least one actuator is configured to vary the height position of the support legs 34 in dependence on at least one out of an acceleration of the self-leveling single axle dump truck 1 and a grade of a ground travelled by the single axle dump truck 1.

In an embodiment, the control system for controlling the at least one actuator 36 is configured to vary the height position of the support legs 34 to maintain a distance of the support legs with respect to ground to be within a range of allowed distances and/or at an allowed distance. In an embodiment, any allowed distance out of the range of allowed distances and/or the allowed distance may be larger than 10 centimeters or larger than 25 centimeters.

In an embodiment, the single axle dump truck has at least one front support leg 34 and at least one rear support leg 34.

In an embodiment, the control system for controlling the at least one actuator 36 is configured to arrange the at least one front support leg at a first height position and the at least one rear support leg at a second height position different from the first height position.

In an embodiment, the control system for controlling the at least one actuator 36 may be configured to raise the support legs to a driving position where they are not in contact with ground on start of a propulsion operation and to maintain the support legs out of contact with ground during normal propulsion operation.

In an embodiment, the control system for controlling the at least one actuator 36 may be configured to lower the support legs at least on one longitudinal side of the single axle dump truck in cases where the self-leveling control system is unable to maintain balance of the single axle dump truck by control of the traction motors, in particular during emergency situations.

In an embodiment, the support legs 34 are provided with leg skids 37.

In an embodiment, the support legs 34 are provided with caster wheels 92.

In an embodiment, the self-leveling single axle dump truck 1 may further comprise, as a primary power source, an internal combustion engine 11 and an alternator 12 driven by the combustion engine 11 for generating electrical energy for driving the first electric traction motor 6 and second electric traction motor 7.

In an embodiment, the combustion engine 11 may be a diesel engine.

In an embodiment, an output shaft 19 of the combustion engine 11 may be mechanically coupled to parasitic loads 14, such as a hydraulic pump, a ventilator and/or a cooling system. The mechanical coupling 15 may for example be via at least one out of a belt drive, a direct coupling, a gear box, a drive shaft and a direct coupled spline joint.

In an embodiment, the self-leveling single axle dump truck 1 may comprise, as a primary power source, a battery for providing electrical energy for driving the first electric traction motor and second electric traction motor. The self-leveling dump truck 1 may in particular be configured as a Battery Electric Vehicle (BEV), i.e. without an internal combustion engine.

In an embodiment, the self-leveling single axle dump truck 1 may further comprise an electrical storage system 16 for storing electrical energy to provide extra power the first electric traction motor 6 and second electric traction motor 7 for mass balancing events.

In an embodiment, the self-leveling single axle dump truck 1 may further comprise an energy control system 17 configured to use, in a full power mode, a maximum allowed power from the internal combustion engine 11 and/or the battery for propulsion of the self-leveling single axle dump truck 1, and to provide, in the full power mode, extra power for unexpected mass balancing events from at least one out of the electrical storage system 16 and a power reserve of the internal combustion engine 11 and/or the battery.

In an embodiment, the maximum allowed power from the internal combustion engine 11 may be a maximum available power from operation of the internal combustion engine 11. In an alternative embodiment, the maximum allowed power from the internal combustion engine 11 may be below a maximum available power from operation of the internal combustion engine 11.

In an embodiment, the electrical storage system 16 may comprise ultra-capacitors.

In an embodiment, the self-leveling single axle dump truck 1 may further comprise an electrical retarder coupled to the first electrical traction motor 6 and the second electrical traction motor 7 for braking the single axle dump truck 1 in at least a first braking mode, the electrical retarder configured to run an alternator 12 as an engine using electrical energy generated by the first electrical traction motor 6 and the second electrical traction motor 7, the alternator 12 configured to drive at least one parasitic power consumer 14 of the single axle dump truck 1 during braking.

Alternatively or in addition, the electrical retarder may be configured to use electrical energy generated by the first electrical traction motor 6 and the second electrical traction motor 7 during braking for powering parasitic power consumers 28 via an auxiliary inverter 27.

Alternatively or in addition, the electrical retarder may be configured to convert electrical energy generated by the first electrical traction motor 6 and the second electrical traction motor 7 to heat via a brake chopper 29 and a grid box 22.

In an embodiment of the self-leveling single axle dump truck 1, wheel bearings of the first wheel 4 and second wheel 5 are rigidly mounted on the frame 2.

In an embodiment, the wheel bearings may be provided by rotational bearings of output shafts of the first electrical traction motor 6 and the second electrical traction motor 7 and/or by rotational bearings of output shafts of a first gearing 8 and a second gearing 9 driven by the first electrical traction motor 6 and the second electrical traction motor 7.

In an embodiment of the self-leveling single axle dump truck 1, the first electrical traction motor 6 and the second electrical traction motor 7 are each rigidly mounted on the frame 2. The mounting may be direct or via the respective gearing.

In an embodiment of the self-leveling single axle dump truck 1, the first gearing 8 and the second gearing 9 are each rigidly mounted on the frame 2. The first electrical traction motor 6 may be mounted on the first gearing 8 and the second electrical traction motor 7 may be mounted on the second gearing 9, with the first gearing 8 and the second gearing 9 each rigidly mounted on the frame 2.

In an embodiment, the first wheel 4 is rigidly mounted on an output shaft of the first electrical traction motor 6 or an output shaft of a first gearing 8 rigidly mounted on at least one out of the frame 2 and the first electrical traction motor 6; and wherein the second wheel 5 is rigidly mounted on an output shaft of the second electrical traction motor 7 or an output shaft of a second gearing 9 rigidly mounted on at least one out of the frame 2 and the second electrical traction motor 7.

In an embodiment, the output shaft of at least one of the gearings 8, 9 may be provided by an outer casing 80, 90 of the gearing. In an embodiment, a tire 40, 50 of at least one out of the first and second wheel may be mounted on the outer casing 80, 90 of the gearing.

In an embodiment, the self-leveling single axle dump truck 1 may further comprise a first gearing 8 connected to the first electrical traction motor 6 and a second gearing 9 connected to the second electrical traction motor 7. Further, the self-leveling single axle dump truck 1 may comprise a first tire 40 of the first wheel 4 and a second tire 50 of the second wheel 5, wherein the first wheel 4 is mounted on a casing 80 of the first gearing forming an output shaft of the first gearing and the second wheel 5 is mounted on a casing 90 of the second gearing 8 forming an output shaft of the second gearing 8.

In an alternative embodiment, wheel bearings of the first and second wheel may be mounted on the frame via a suspension.

In an embodiment, the self-leveling single axle dump truck 1 may further comprise a remote controller 23 for controlling the single axle dump truck 1, the remote controller 23 allowing full loading and unloading control and limited propel control.

In an embodiment, the self-leveling single axle dump truck 1 may further comprise a towing receptacle 55 for towing the single axle dump truck. The towing receptacle 55 may be configured for insertion of a towing bolt and may be provided with a vertical stop 56 carrying the load of the self-leveling single axle dump truck 1 if the self-leveling single axle dump truck 1 is de-energized.

Figure 10:
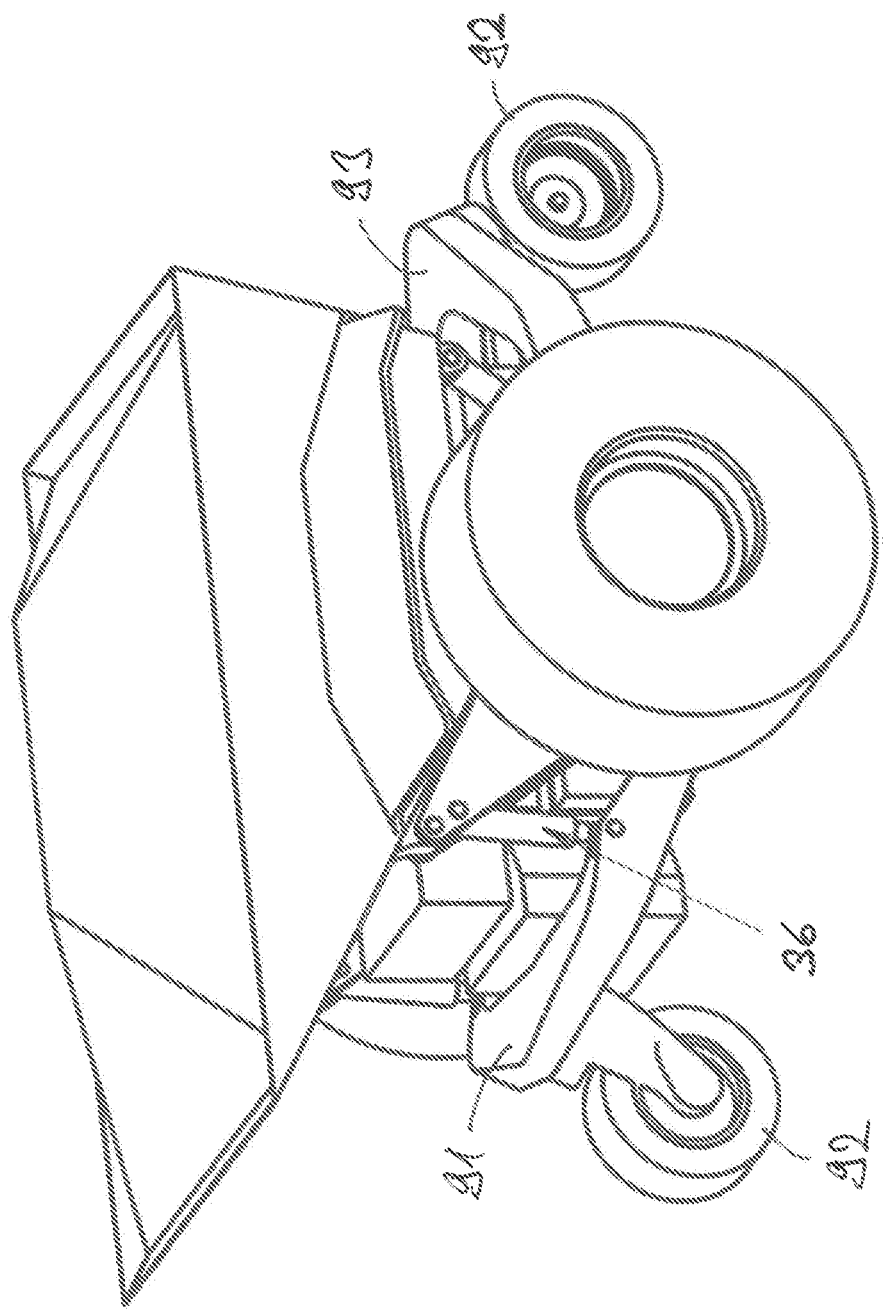
FIG. 10 is a perspective view of a second mechanical concept a truck.
Figure 11:
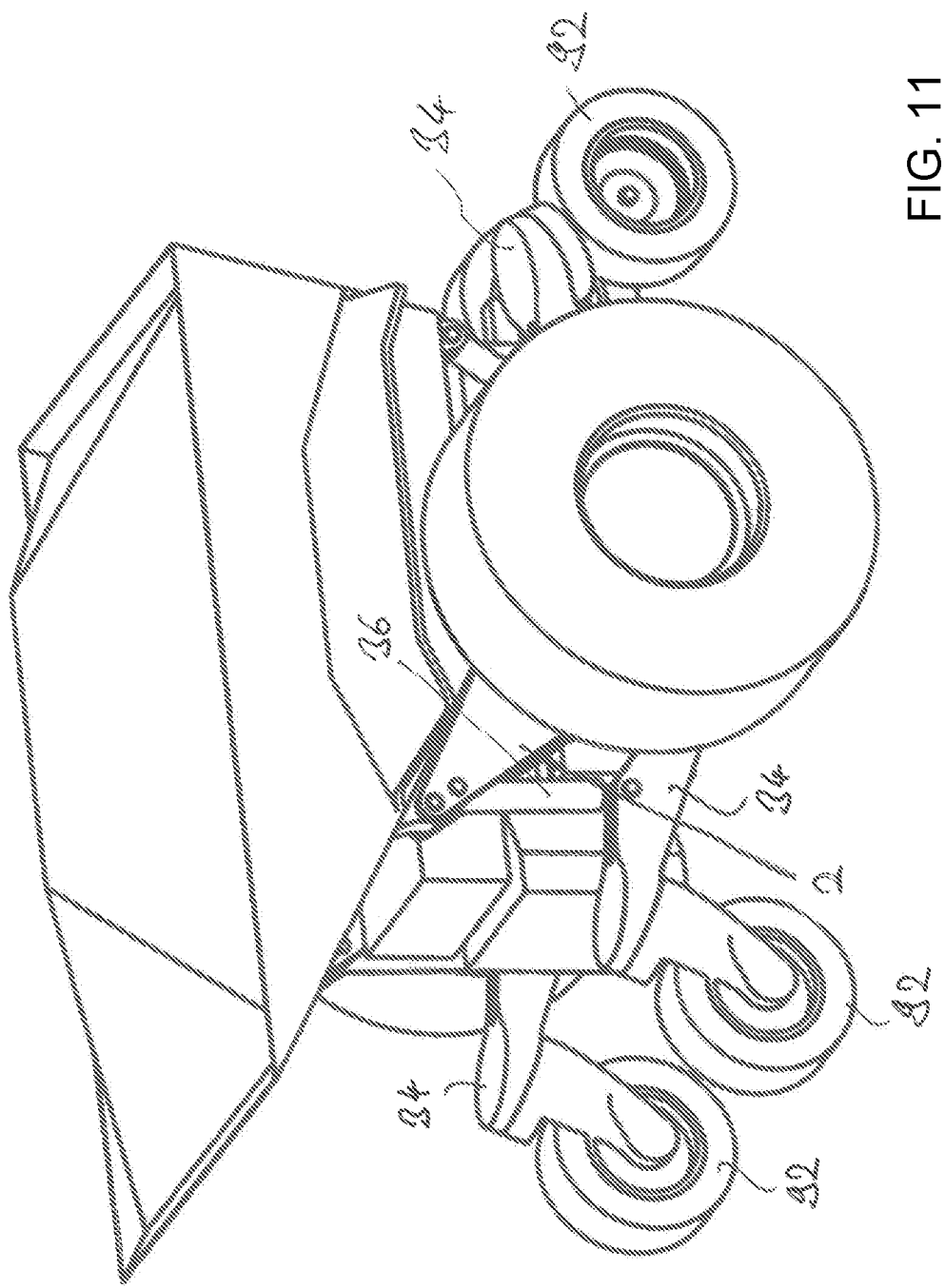
FIG. 11 is a perspective view of a third mechanical concept a truck, FIG. 12 a diagram showing actions of a first embodiment of a method for operating a truck, FIG. 13 a diagram showing actions of a second embodiment of a method for operating a truck, FIG. 14 a diagram showing actions of a third embodiment of a method for operating a truck, and FIG. 15 a diagram showing actions of a fourth embodiment of a method for operating a truck.

FIGS. 10 and 11 show alternative mechanical configurations of the support legs used for stabilizing the dumper truck, the support legs being provided with caster wheels 92.

So far, the present application has been described with respect to dump trucks comprising a dump body pivotably attached to the frame. However, the concepts of the present application are not restricted to be used with dump trucks comprising a dump body pivotably attached to the frame, but may be used for any truck application.

For example, in a second embodiment, a self-leveling single axle load truck 1 is provided comprising a frame 2, a load carrier 30 mounted on the frame 2 and a propulsion and self-leveling system comprising a single axle 3 supporting the frame 2 at least during motion of the self-leveling single axle dump truck 1, the single axle 3 comprising at least a first and a second wheel 4, 5 and at least a first electric traction motor 6 for driving the first wheel 4 and a second electric traction motor 7 for driving the second wheel 5. The self-leveling single axle load truck 1 may further comprise support legs 34 arranged on the frame 2 and at least an actuator 36 for lowering the support legs 34 into at least a first support position where they at least partly support the frame 2, and for raising the support legs 34 into at least one drive position where the frame 2 is only supported by the single axle 3.

In the second embodiment, the load body may be rigidly mounted on the frame. Otherwise, the second embodiment may have the same features as described above and in the following with respect to embodiments of a dump truck.

Figure 3:
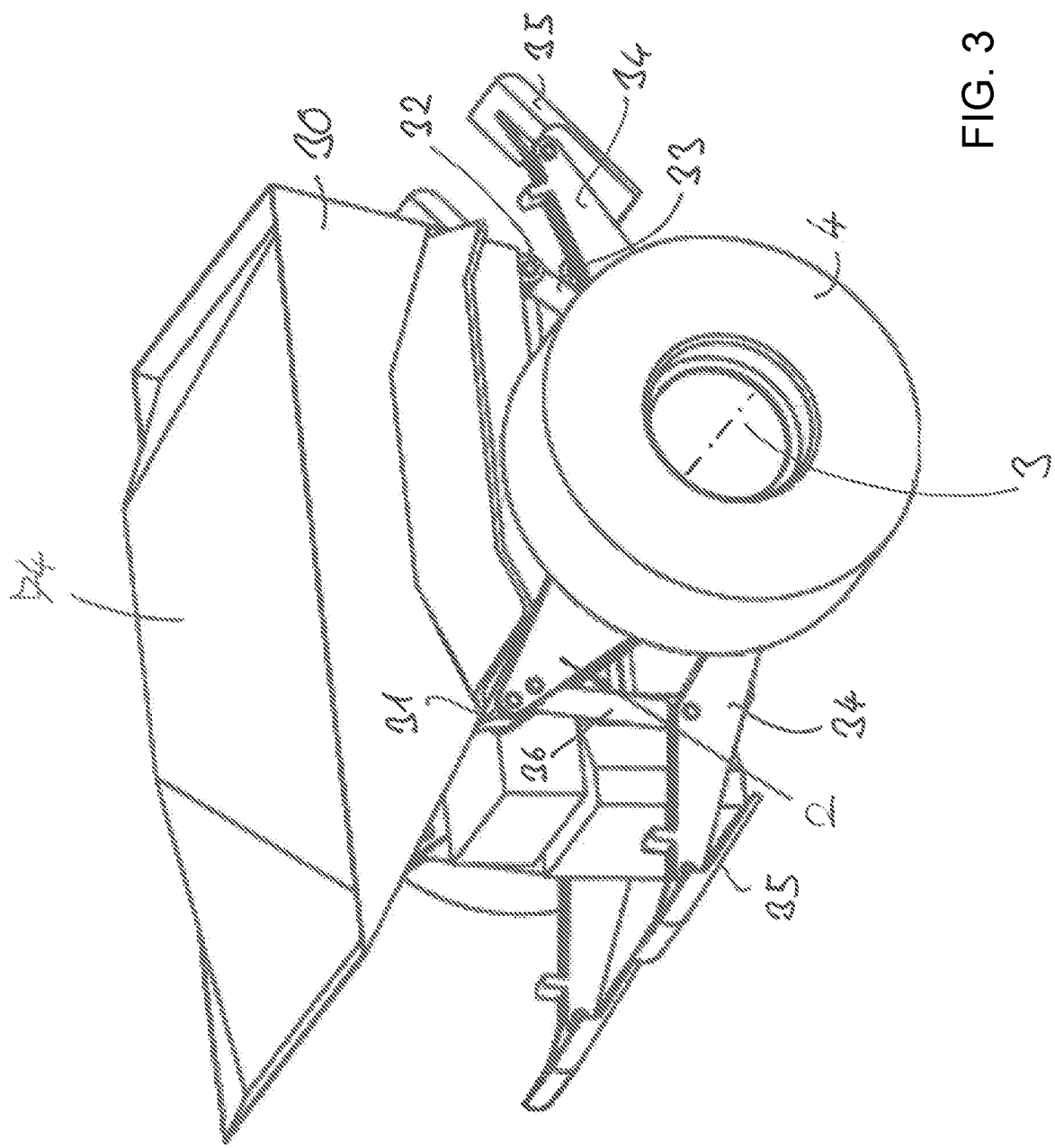
FIG. 3 is a perspective view of a first mechanical concept a truck.
Figure 4:
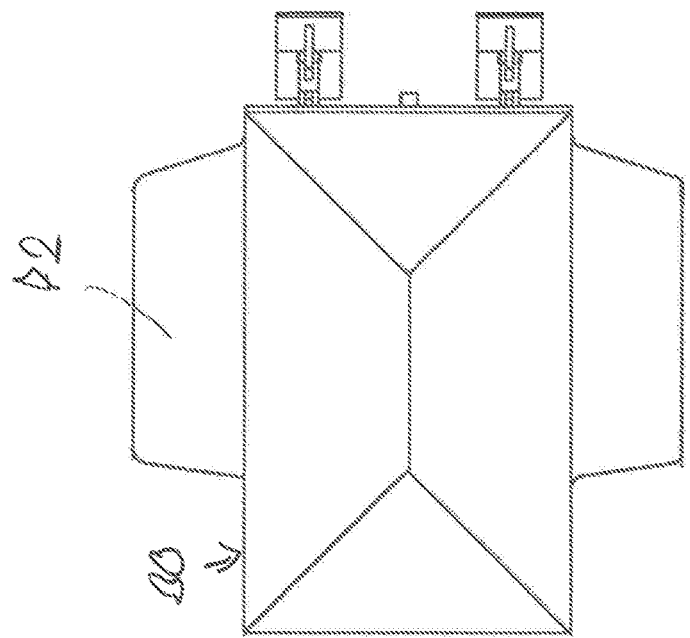
FIG. 4 is side view and a top view of the first mechanical concept a truck.
Figure 4:
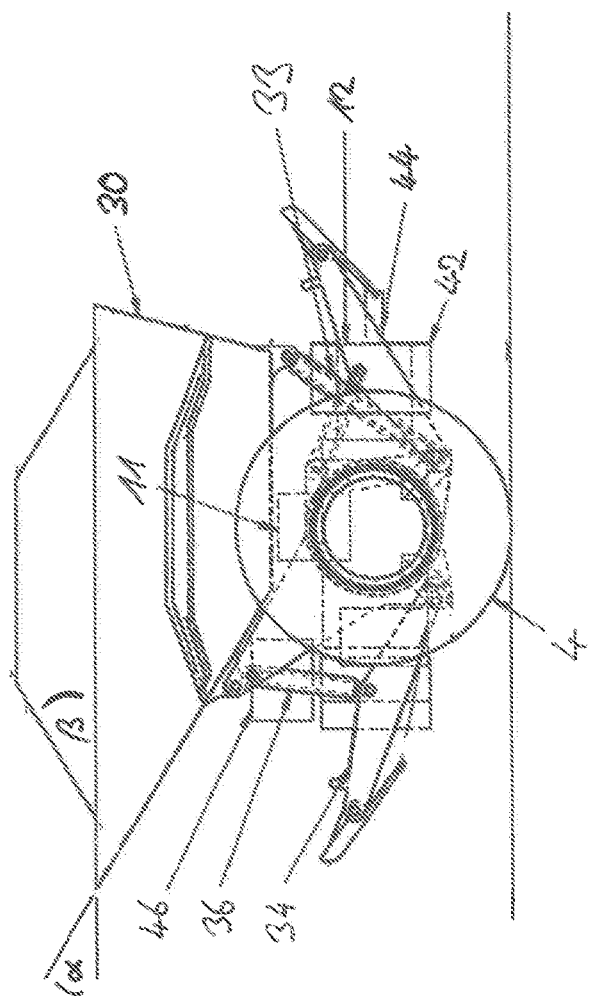

Embodiments of methods for operating a self-leveling single axle dump truck are shown in FIGS. 12 to 15. For example, instructions for carrying out the methods shown in FIGS. 12 to 15 may be executed by a controller (e.g., such as controller 20, controller 100, and controller 23 shown in FIG. 1) based on instructions stored on a memory of the controller and in conjunction with signals received from sensors of the engine system, such as the sensor 21 described above with reference to FIG. 1. The controller may employ actuators of the self-leveling single axle dump truck, such as an actuator for lowering support legs (e.g., such as actuator 36 and support legs 35 of FIG. 3), in order to adjust operation according to the methods described below.

In an embodiment, the methods relate to operating a self-leveling single axle dump truck comprising a frame, a dump body pivotably mounted on the frame and a propulsion and self-leveling system comprising a single axle supporting the frame at least during motion of the self-leveling single axle dump truck, the single axle comprising at least a first and a second wheel, and at least a first electric traction motor for driving the first wheel and a second electric traction motor for driving the second wheel.

In an embodiment, the methods may relate to operating a self-leveling single axle dump truck as described above or in the following.

FIG. 12 shows a first embodiment of a method. The method may comprise the following blocks S1 to S3:

Block S1 may comprise driving the single axle dump truck by controlling the first electric traction motor and the second electric traction motor to generate a driving torque.

Block S2 may comprise self-leveling the single axle dump truck by controlling the first electric traction motor and the second electric traction motor to generate a self-leveling torque that is combined with the driving torque. Block S2 may be performed simultaneously with block S1 of driving the single axle dump truck. Block S2 may in particular comprise reading a sensor output and controlling the first electric traction motor and the second electric traction motor to generate the self-leveling torque based on the sensor output. The sensor output may be processed to determine an inclination of the self-leveling the single axle dump truck.

Block S3 may comprise steering the single axle dump truck by controlling the first electric traction motor and the second electric traction motor to generate wheel speed differentials between the first wheel and the second wheel. Block S3 may be performed simultaneously with block S1 of driving the single axle dump truck in a first driving direction.

In an embodiment, block S3 may comprise controlling the first electric traction motor and the second electric traction motor to turn in opposite rotational directions.

In a further embodiment shown in FIG. 13, the method may comprise the following blocks S4 to S7:

Block S4 may comprise driving the single axle dump truck, the single axle dump truck supported only on the single axle. Block S4 may comprise blocks S1 to S3 as sub-blocks.

Block S5 may comprise stopping the single axle dump truck. In particular, Block S5 may comprise stopping the single axle dump truck by at least one out of controlling the first electric traction motor and the second electric traction motor and controlling the brakes. In particular, the first electric traction motor and the second electric traction motor may be controlled to generate a braking torque and the brakes may be controlled to apply a braking force to stop the single axle dump truck.

Block S6 may comprise lowering support legs into at least one support position where they at least partly support the frame.

Block S7 may comprise at least one out of loading the single axle dump truck by filling the dump body and un-loading the single axle dump truck by hoisting the dump body.

In a further embodiment shown in FIG. 14, the method may comprise the following blocks S8 to S11:

Block S8 may comprise driving the single axle dump truck in a first driving direction by controlling the first electric traction motor and the second electric traction motor to rotate in a first angular direction. In particular, block S8 may comprise driving the single axle dump truck in a first driving direction from a loading position to a dumping position or from dumping position to a loading position. The loading position and the dumping position may be defined by a mission.

In embodiments of the present application, block S8 may comprise blocks S1 to S3 as sub-blocks.

Block S9 may comprise stopping the single axle dump truck. In embodiments of the present application, block S9 may comprise block S6 as a sub-block. In particular, the embodiment may comprise lowering support legs into at least one support position where they at least partly support the frame before, during or after stopping the vehicle.

Block S10 may comprise at least one out of loading the single axle dump truck by filling the dump body and un-loading the single axle dump truck by hoisting the dump body.

Block S11 may comprise driving the single axle dump truck in a second driving direction without turning around. In particular, block S11 may comprise driving the single axle dump truck in a second driving direction opposite to the first driving direction by controlling the first electric traction motor and the second electric traction motor to rotate in a second angular direction opposite to the first angular direction.

In an embodiment, block S11 may comprise driving the single axle dump truck in the second driving direction from a dumping position to a loading position or from a loading position to a dumping position.

In embodiments of the present application, block S11 may comprise blocks S1 to S3 as sub-blocks, with the direction of travel reversed. In particular, the embodiment may comprise raising the support legs into at least one travel position before, during or after driving the single axle dump truck in the second driving direction.

In the following, methods for braking, stopping, re-accelerating and starting a single axle vehicle are disclosed. These methods may in particular be used with a self-leveling single axle truck comprising a frame, a dump body and a propulsion and self-leveling system comprising a single axle supporting the frame at least during motion of the self-leveling single axle dump truck, the single axle comprising at least a first and a second wheel, and at least a first electric traction motor for driving the first wheel and a second electric traction motor for driving the second wheel. In an embodiment, the dump body may be fixedly or pivotably mounted on the frame.

In an embodiment, the methods may relate to operating a self-leveling single axle dump truck as described above or in the following.

The methods may be used independently of the further methods disclosed in this application, or as part of these methods.

In an embodiment of the present application, braking or stopping the vehicle from a propulsion operation may comprise controlling the first and the second traction motor to make the vehicle transit from a propulsion state where it is leaning in a first direction out of a forward and backward direction, and in particular towards a direction of travel, into a braking state where it is leaning in a second direction out of a forward and backward direction, and in particular backwards away from a direction of travel. This may in particular be the case for braking or stopping the vehicle from a propulsion operation in which the vehicle is travelling on flat and/or firm ground.

In an embodiment, this may comprise controlling the first and the second traction motor to speed up and/or overpropel the vehicle in the forward direction in order to cause the vehicle to lean backwards.

In an embodiment, only once the vehicle is in the braking state and in particular leaning backward and away from the initial direction of travel, the speed of the vehicle is reduced by controlling the brakes to apply a braking force and/or control the traction motors to reduce speed and/or generate a braking torque on the wheels.

In a further embodiment of the present application, re-accelerating the vehicle from a braking operation may comprise controlling the first and the second traction motor to make the vehicle transit from a braking state where it is leaning in a second direction out of a forward and backward direction, and in particular away from a direction of travel, into a propulsion state where it is leaning in a first direction out of a forward and backward direction, and in particular towards a direction of travel. This may in particular be the case for re-accelerating the vehicle from a braking operation in which the vehicle is travelling on flat and/or firm ground.

In an embodiment, this may comprise controlling the first and the second traction motor and/or the brakes to further slow down and/or overbrake the vehicle in order to cause the vehicle to lean forwards.

In an embodiment, only once the vehicle is in the propulsion state and in particular leaning towards the direction of travel, the speed of the vehicle is increased by controlling the traction motors to generate a propulsion torque on the wheels.

In a further embodiment of the present application, starting the vehicle from rest may comprise controlling the first and the second traction motor to make the vehicle transit into a propulsion state where it is leaning in a first direction out of a forward and backward direction, and in particular towards a direction of travel. This may in particular be the case for starting the vehicle on flat and/or firm ground.

In an embodiment, this may comprise controlling the first and the second traction motor to drive the vehicle in a direction opposite to the direction of travel in order to cause the vehicle to lean forwards.

In an embodiment, only once the vehicle is in the propulsion state and in particular leaning towards the direction of travel, the traction motors are controlled to propel the vehicle in the direction of travel.

FIG. 15 shows a further embodiment of a method. The method may be performed by a control system of the single axle dump truck. The method may comprise blocks S12 and S13.

Block S12 may comprise receiving a mission from a central mission controller. The central mission controller may be a mine site controller providing missions to a plurality of autonomously controlled dump trucks.

Block S13 may comprise autonomously controlling the single axle dump truck along the mission.

In embodiments of the present application, block S13 may comprise any of blocks S1 to S11 as sub-blocks.

In particular, in an embodiment, block S13 may comprise blocks S1 to S3 as sub-blocks, wherein the method further comprises determining a position of the vehicle and wherein in block S3, the single axle dump truck may be steered along a path defined by the mission by generating wheel speed differentials between the first wheel and the second wheel.

Further, in an embodiment, block S13 may comprise blocks S8 to S11 as sub-blocks, wherein the first direction and the second direction and the loading position and dumping position are defined by the mission received from the central mission controller.

In further embodiments, the method may comprise manually controlling the single axle dump truck using a remote controller. Such manual control could e.g. be used to maneuver the single axle dump truck into a parking position.

In an embodiment, the single axle self-leveling dump truck may be used in mines for transport purposes. In an embodiment, the single axle self-leveling dump truck may have a payload of more than 10, 50, 100 or 200 metric tons. In an embodiment, the single axle dump truck may have a gross vehicle weight (GVW) of more than 120, 100, 200 or 400 metric tons.

In an embodiment, the single axle self-leveling dump truck may be used in earth moving applications.

In an embodiment, the single axle self-leveling dump truck may have a payload of more than 0.5 metric tons. In an embodiment, the single axle self-leveling dump truck may have a payload of less than 50 metric tons.

In an embodiment, the single axle dump truck may have a gross vehicle weight (GVW) of more than 0.5 metric tons.

Further details and embodiments of single axle self-leveling trucks and of methods for operating a single axle self-leveling truck will be described in the following.

In an embodiment, the single axle self-leveling truck may have a single axle 3 and the loaded mass may be suspended above the axle 3. The concept may be based on an inverted pendulum design with controls suitable for maintaining stability.

The truck may have a plurality of support legs 34 which are hydraulically operated and are fully deployed when the truck is dumping, loading, parked or during other required instances for stability. In an embodiment, the truck may have 4 support legs 34. In alternative embodiments, the truck may have 2 or 3 support legs, see FIG. 11.

The support legs may be operated with a controlled height from grade during propulsion events to minimize the falling height in case of an unplanned event.

In an embodiment, the truck may be powered by a diesel engine 11 which powers an AC electric drive system. The truck may have a grid box 22 for dynamic braking, in addition an Active Front End (AFE) functionality. In AFE mode, the traction motors 5, 6 may act as generators to convert braking energy to electrical. This electrical energy may be used to run the alternator/engine shaft 19 to provide power to the trucks parasitic power consumers 14. For stopping, the truck may utilize a dry disc brake system for weight and cost benefits.

Other configurations of a single axle self-leveling truck may use other energy source configurations, such as trolley, Battery Electric Vehicle (BEV), Hybrid Electric Vehicle (HEV).

In particular, in one configuration, the single axle self-leveling truck may be a Battery Electric Vehicle (BEV). In such a configuration, the single axle self-leveling truck is provided with a battery that supplies the energy for the entire operation of the single axle self-leveling truck. In particular, in such a configuration, the single axle self-leveling truck may be configured without an internal combustion engine. Once the battery is empty, it may be loaded during times when the single axle self-leveling truck is inoperative, or may be replaced by a full battery if it is empty to allow the single axle self-leveling truck to operate continuously. The battery may be combined with an ultra-capacitor in order to provide increased power for short periods of time, such as for self-leveling operations.

The single axle self-leveling truck may be an autonomous truck which does not have a cab for the operator.

The single axle self-leveling truck may be provided with ultra-capacitors 16 which store energy during retarding events and/or during propelling from the engine. The ultra-capacitors 16 may cater to potential sudden power requirements for suspended mass balancing or other needs which the engine 11 and drive system may not be able to deliver in the required time.

In possible embodiments, the truck may have one or more of the following features:
- 50%-50% weight distribution under empty and loaded conditions on each wheel 4, 5 which increases tire life;
- Bi-directional loading avoids turning around at loading or dumping thus reducing cycle time;
- Zero turn radius for increased maneuverability;
- High payload to EVW ratio ensures greater fuel efficiency and decreased cost per ton;
- Simplified design reduces maintenance and downtime;
- No suspension and steering ensure fewer mechanical and hydraulic components;
- In an alternative configuration, the single axle self-leveling truck may be provided with a suspension;
- Fully autonomous truck without cab reduces components and decreases cost per ton;
- Wired/wireless controller 23 for driving and maneuvering into a maintenance bay;
- Towing receptacle 55 for mobilizing the truck in a loss of power or stuck condition.

Details of embodiments of the truck will be described in the following:

Frame Configuration

Figure 5:
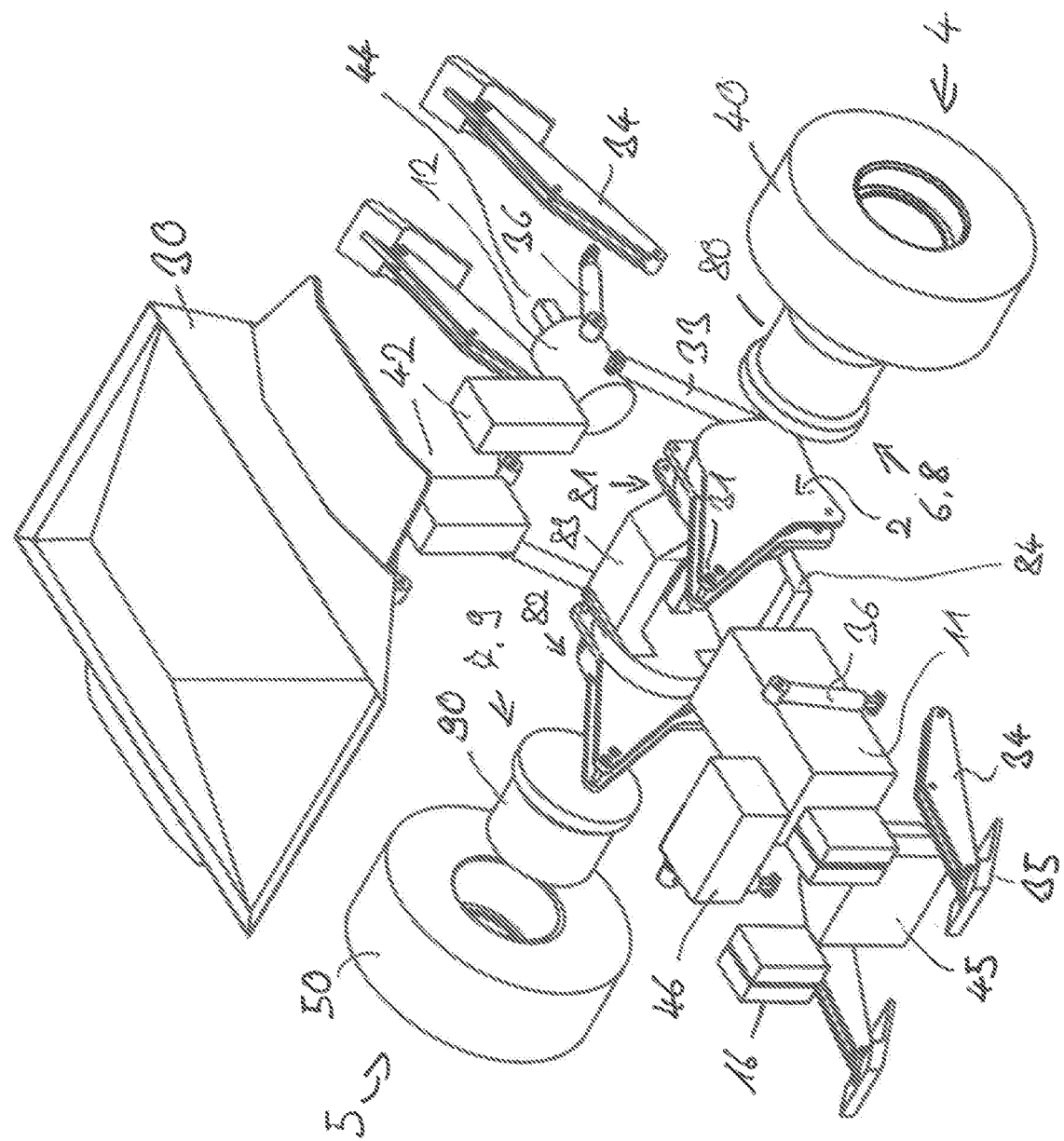
FIG. 5 is an exploded view of the first mechanical concept a truck.

As shown in FIG. 5, the Frame 2 of the truck may house the dump body 30, hoist cylinders 33, engine 11, fuel tanks 42, alternator 12, hydraulic pump 44, a hydraulic oil tank, radiator 45, support legs 34, traction motors 6, 7, ultra-capacitors 16 and a control cabinet 46. The control cabinet 46 may comprise an autonomy package The gear drives provided by a combination of electric traction motors 6,7 and gearings 8, 9 may be mounted directly to the frame 2, eliminating the need for a traditional axle box. In an alternative embodiment, the electric traction motors 6,7 may be mounted to the frame 2 via a suspension.

The frame for the truck may be made from steel. It may comprise welded and cast structures. The frame will allow space for installation and proper maintenance of engine, hydraulics, and all required service activities.

The frame 2 may be configured such that the center of mass is at a level above ground that is above the level of the single axle 3 both in an unloaded and in a loaded state of the dump body. Thereby, inclination of the single axle dump truck can be used to absorb acceleration torque.

The frame 2 and the dump body 30 may be configured such that the dump truck is balanced with respect to the single axle. This may apply for at least one or both out of an unloaded and a loaded condition of the dump truck.

In an embodiment, the engine 11 may be arranged at a position between the tires 4 in a longitudinal direction and/or with its center of mass above the axle 3 in a vertical direction. In other configurations, the engine may be lateral, in front of or behind the single axle 3.

The frame 2 may comprise left and right side plate structures 81, 82. Each side plate structure 81, 82 may be provided with a connecting portion for a traction engine 6, 7 on its outer side, a bearing point for the dump body 30, and a bearing point for a hoisting cylinder 33 of the dump body. Further, each of the side plate structures 81, 82 may be provided with bearing points for the front and rear support legs 34 and the corresponding cylinders 36.

The left and right side plate structures 81, 82 may be connected by lower and upper transverse beams 83, 84. The engine 11 may be encased between the side plate structures and the lower and upper transverse beams.

In the embodiment, the side plate structures 81, 82 are each formed by two or three parallel plates connected by distance elements, with free ends of the plates carrying the bearing points.

Dump Body

Figure 7:
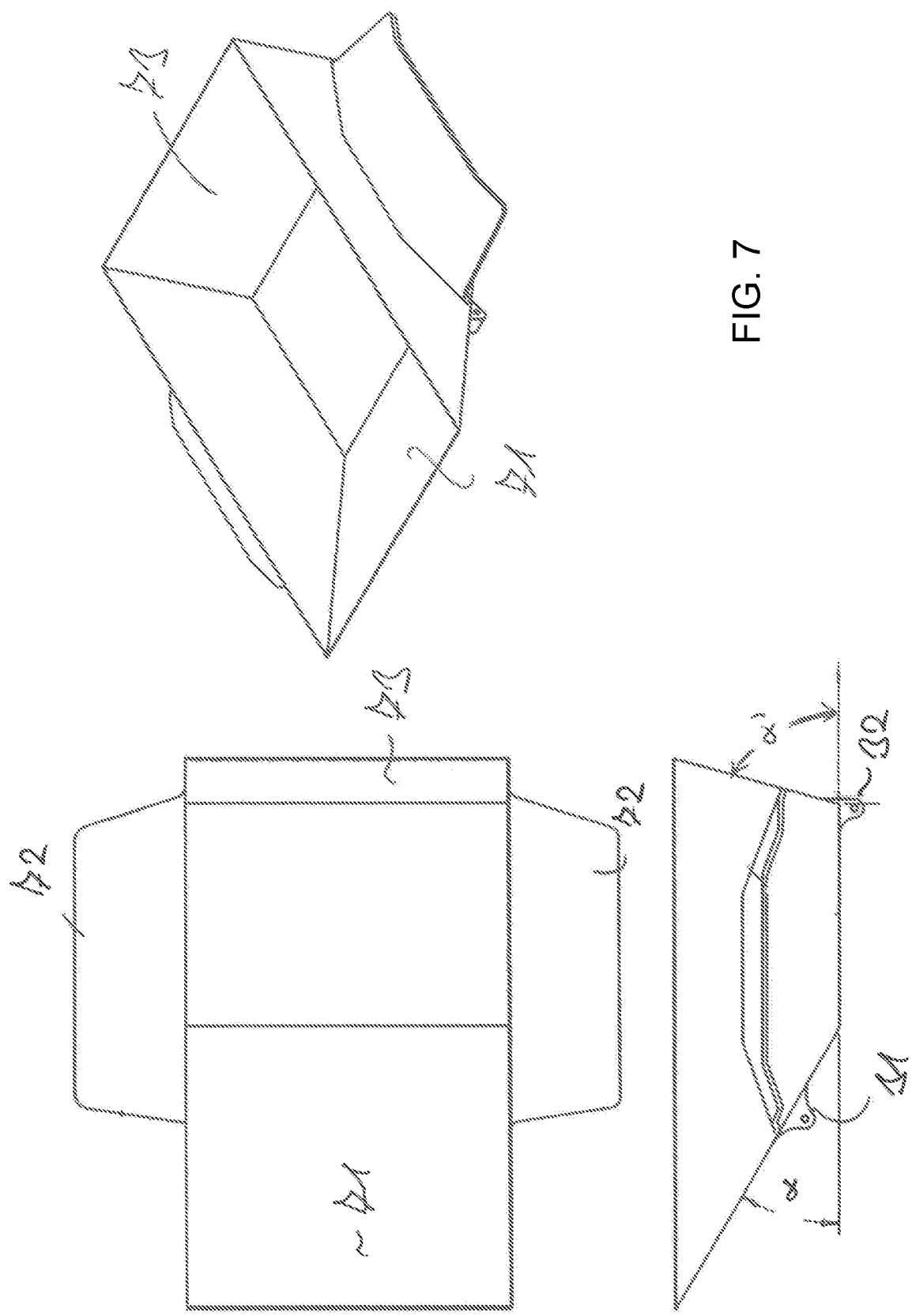
FIG. 7 is a top view, a perspective view and a side view of the dump body of the first mechanical concept a truck.
Figure 8:
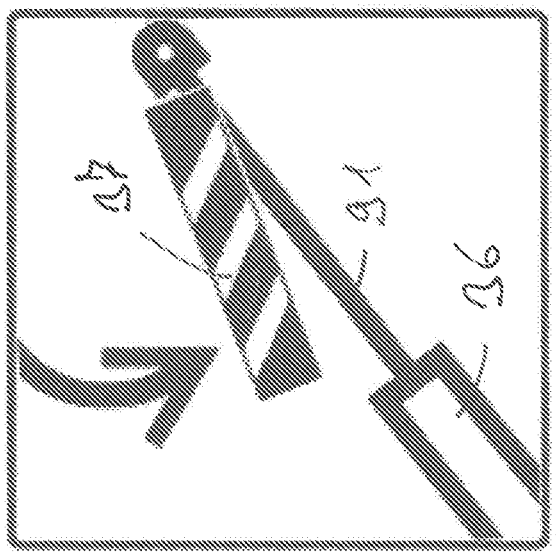
FIG. 8 is a schematic drawing of a locking bracket for the support legs for the first mechanical concept a truck.

An embodiment of a dump body 30 is shown in FIG. 7. The dump body 30 may be supported by the frame 2 around a horizontal pivot axis 31 and lifted by hydraulic hoist cylinders 33. The hoist cylinders 33 may be attached to the dump body at 32 and used to raise the dump body 30. When the dump body 30 is in the lowered position, the hydraulic cylinders 33 may not bear the load of the dump body 30 or the payload. Guides may be provided for lateral stability. Pads may be provided for load bearing capacity in the lowered position.

The dump body 30 and the loaded mass may be above the frame and axle centerline. The resulting center of gravity of the assembly may be above the frame 2, which will be balanced using the electric traction motors 6, 7 and controls architecture.

The dumping process may only begin once the stabilizing legs 34 have been deployed and the truck is in an inherently stable state.

The dump body may be provided on both lateral sides with roof sections 72 arranged above the wheels 4 and 5. In an alternative configuration, the wheels 4 and 5 may be partly or completely arranged under a bottom side of the dump body. In such a construction, because the tires 40 and 50 are tucked under the dump body, the overall width of the design may be reduced.

The dump body 30 may have a first longitudinal side wall 71 and a second longitudinal side wall 73. In the embodiment, first longitudinal side wall 71 and the second longitudinal side wall 73 may have a different inclination α and α'. First longitudinal side wall 71 having the smaller inclination α may be arranged on a longitudinal side of the truck to which the dump body is emptied.

As the dump truck is not provided with a cabin, no space requirements have to be respected in either longitudinal direction. Further, no safety roof structure is required.

The dump body 30 may be filled with a conical heap 74 with angle β of repose of between 20 and 40 degrees.

The dump body may have a capacity of more than 5 cubic meters and may hold at least 10 metric tons of material.

In an alternative embodiment, the dump body may have a capacity of more than 0.5 cubic meters and may hold at least 0.5 metric tons of material.

Support Legs

Support legs 34 may be pivotably attached to the frame 2. Lowering and raising may be provided by hydraulic cylinders 36.

In FIGS. 1 to 9, an embodiment with four legs is shown. Each leg 34 is provided with a leg skid 35. The leg skid 35 may be pivotably attached to the lower end of the support leg 34.

In the embodiment shown in FIG. 10, a front leg carrier 91 and a rear leg carrier 93 are provided as support legs, each of which is lowered and raised by at least one hydraulic cylinder 36.

Front leg carrier 91 and a rear leg carrier 93 each carry a wheel 92 for supporting the frame on the ground. The wheels 92 have a pivot axis to allow support of the frame on the ground during tow haul operation. The pivot axis may be configured without a steering system.

In the embodiment shown in FIG. 11, four wheel carriers 34 are provided as support legs, each wheel carrier provided with a wheel 92. The wheels 92 have a pivot axis to allow support of the frame on the ground during tow haul operation. The pivot axes may be configured without a steering system.

In alternative configurations, two wheels and/or two wheel carriers may be provided on a front or rear side and one wheel and/or one wheel carrier may be provided on the other side.

Tires

Each tire may carry at least 10, 20 or 50 metric tons. In an embodiment, each tire may carry a load of more than 100 metric tons. In an alternative embodiment, each tire may carry at least 0.5 metric tons. In an embodiment, each tire may carry a load of more than 1 metric tons. The tires will provide spring and some minimal damping effects, thereby acting as a suspension on this truck. In an embodiment, there is no separate suspension on the truck. In an alternative embodiment, a suspension may be provided.

Engine/Power

The truck may use a diesel engine. The engine may have more than 10 or more than 16 pistons. It may have a total displacement of more than 20 liters. The engine may be equipped with a SCR exhaust gas after-treatment system, and may comply with EPA CARB Tier 4 exhaust emission limits. The engine may permit multiple fuel injections at a pressure of more than 1000 bar. This engine may be a primary source of power. The engine may drive an alternator generating electrical energy for driving the traction motors.

In an alternative configuration, the single axle self-leveling truck may be a Battery Electric Vehicle (BEV). In such a configuration, the single axle self-leveling truck is provided with a battery as a primary source of power.

In addition to an internal combustion engine or a battery, the truck may have an ultra-capacitor module.

The ultra-capacitors may be charged from the engine, the battery and/or braking energy. The ultra-capacitors may provide power to the truck in a short amount of time for stability requirements. The ultra-capacitors can offer decreased power response time in comparison to a diesel engine and alternator assembly or the battery which may be necessary for truck stabilization.

In an embodiment, power from the ultra-capacitors may be used for providing a self-levelling torque necessary to self-level the single axle dump truck. In particular, the power from the ultra-capacitors may be used in cases where the internal combustion engine or the battery is unable to provide the necessary power for self-levelling. This may be because the maximum power of the internal combustion engine or the battery is insufficient and/or because the power output of the internal combustion engine or the battery cannot be increased quickly enough.

A hydraulically driven engine fan or a belt driven engine fan configuration may be used.

Hydraulic System

In an embodiment, a hydraulic pump 44 may be mounted to the rear of the alternator 12 connected mechanically without any gear reduction. In a BEV configuration, the hydraulic pump may be driven by a separate electric engine. Further, the hydraulic system may be partly or completely replaced by an electric system.

There may be several hydraulic accumulators in the truck which cater to the hydraulic requirement of the brakes and legs actuation. Other hydraulic systems include gear oil cooling, control cabinet cooling, blowers (if hydraulic), and engine fan (if hydraulic). A hydraulic manifold may be provided to cater to the above requirements diverting the flow as required.

Figure 6:
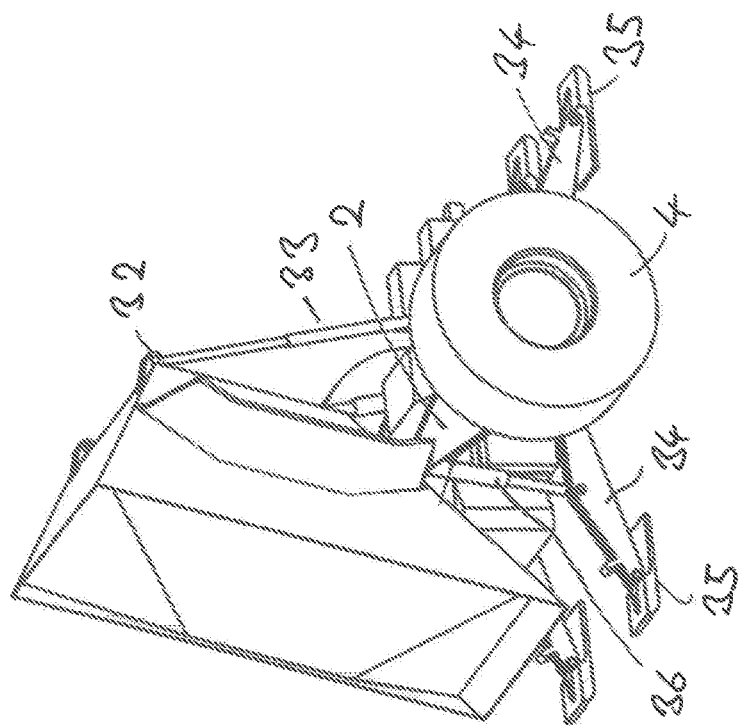
FIG. 6 is a top view, a perspective view and a side view of the first mechanical concept a truck with the dump body in a hoisted position.
Figure 6:
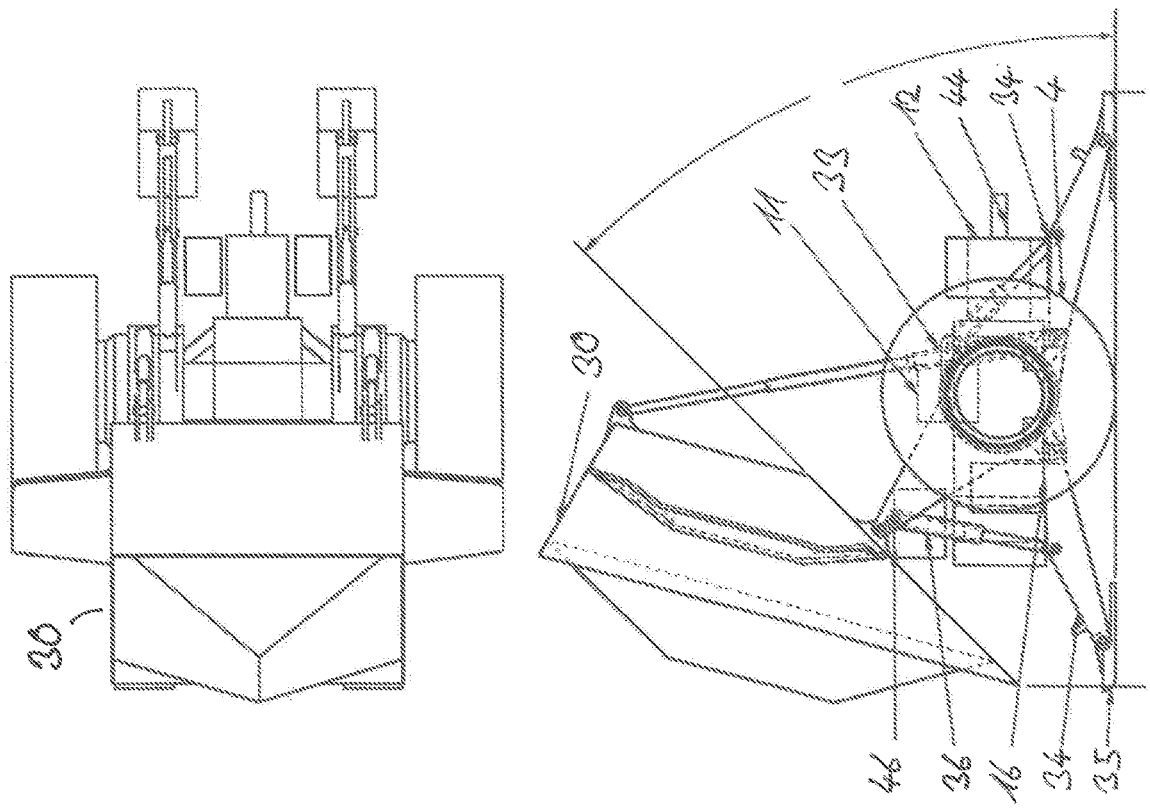

The support legs 34 may be hydraulically operated as shown in the FIG. 6. The hydraulic system for the support legs 34 is configured with a sufficient rate of actuation to maintain a pre-determined height from the ground. In an alternative configuration, the support legs may be driven by an electric actuator.

Figure 9:
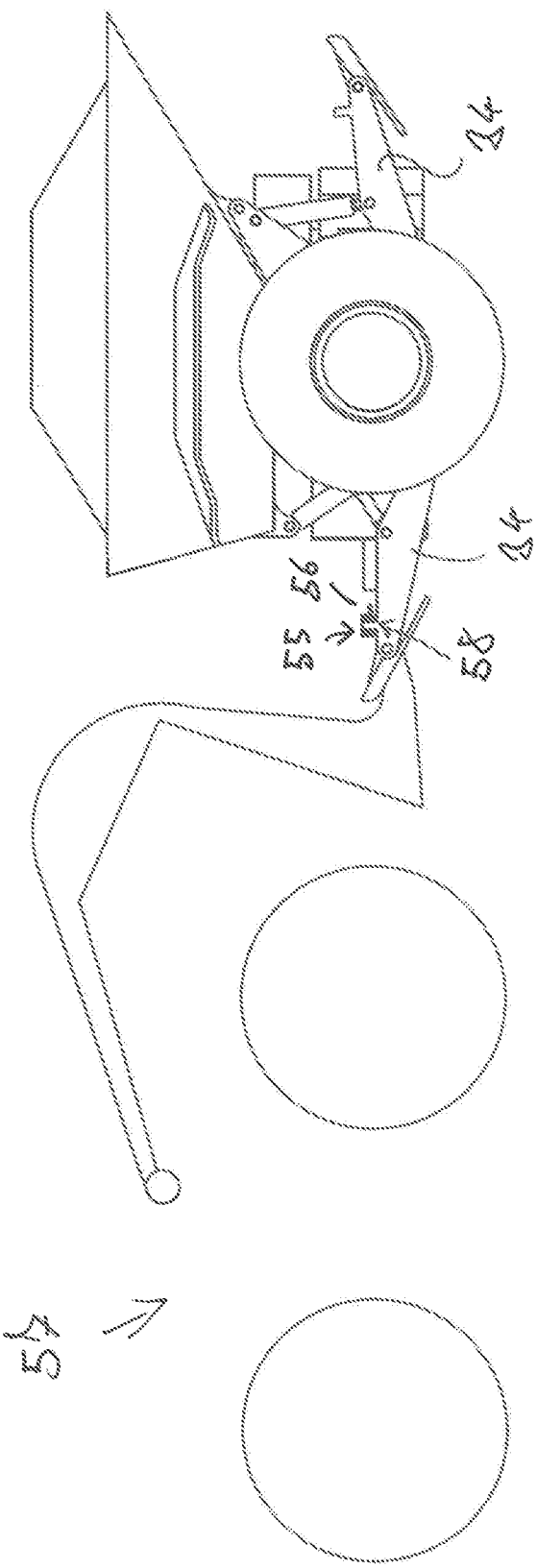
FIG. 9 is a side view of a towing concept for the first mechanical concept a truck.

In an embodiment, the support legs may be capable to lift the truck for maintenance of the tires or wheel drives. During this jacking condition with the support legs 34, the actuators of the support legs, such as the support leg cylinders 36 or electric actuators, may be locked out to ensure no undesired movement of the truck. A locking bracket 37 used for this purpose is shown in FIG. 9.

To operate the truck in jacking mode, a selection should be activated on the wired or wireless remote control interface which ensures the sequence of required activities to jack the truck.

Parasitic Load Configuration

In an embodiment in addition to the propulsion power requirement, parasitic power on the truck may be provided by the engine 11. Kinetic energy of the truck during times of retarding can also be utilized to power these parasitic loads 14, 28 using AFE functionality. Table 2 below provides the estimated parasitic power values in a standard propulsion condition.

Drive System

The top level drive system architecture is shown in FIG. 2. The control system and AC drive system with traction motors 6, 7 capable of switching directions may be used for ensuring the stability of the truck. The traction motors 6, 7 may be controlled by power stacks 25 and 26.

The drive system may be capable to function in AFE mode.

There may be two traction motors 6, 7, one driving each wheel 4, 5 which will propel the wheels on the truck. The traction motor should provide enough torque to propel the truck, absorb braking power, and maintain stability under standard operating conditions. The ultra-capacitors 16 may provide the power to the drive in case of sudden requirements for balancing the suspended frame components or other requirements.

The alternator 16 may convert the engine's 11 mechanical power to electrical power and provides this to the DC bus 24. It also acts as a traction motor and will drive the engine 11 in AFE mode. During retarding, the traction motor 6, 7 will act as a generator to convert mechanical energy to electrical energy. This energy will be used to run the engine 11 and alternator 12, catering to the requirements of the parasitic loads 14. During AFE mode, fueling may be cut off from the engine thereby reducing fuel consumption. If there is any unused braking power which cannot be absorbed by parasitic loads 14 or 28, it will be dissipated in the grid box 22.

Infrastructure

As the truck has mass suspended over axle, a towing procedure may be specifically designed for the truck.

As shown in FIG. 10, the truck may have an additional towing support apparatus 55 designed to allow a standard tow truck 57 with a tow pin 58 to be used for towing and recovery.

This component will be used to lift the truck on either side. A retaining mechanism 56 may be provided to retain the tow pin 55 due to the limited weight on the pin in the level position.

Prior to beginning the towing procedure, the truck may be in the "legs down" condition and the dump body empty. When the pin 58 is retained the hydraulics can then be actuated to raise the support legs 34 to the towing condition.

To fully disable the truck all stored energy may be locked out. In the stationary position the support legs will be deployed. This condition can be with the tires on the ground or in the jacking condition with the tires off the ground. To lock out the support leg hydraulic cylinders, a bracket 37 is provided that can saddle the piston rod 91 and mechanically maintain the cylinder 36 in the extended position. This bracket 37 may be made of non-marring materials and not damage the piston seal surface with regular installation. FIG. 9 shows an example of the lock-out hardware.

A wired or wireless remote control interface box for remote controller 23 may be included to allow manual operation of the truck. The wired connection should be long enough to allow safe operation of the truck. Features should include: full hydraulic control and limited propel control.

Brakes

This truck may have dry disk brakes with a grid box 22 to dissipate braking energy. The brake discs may be fitted inboard on the truck and spin at armature speed. The truck may also be equipped with AFE functionality. Braking generates energy in traction motor/generator which is utilized to run the alternator/engine shaft 19 to run the accessories and parasitic loads on the truck as mentioned above. Under these conditions, the engine may de-fuel in an attempt to reduce the engine speed. This reduces fuel consumption and operating costs. If the energy from the braking is not required in AFE, it may be dissipated to the grid box 22.

The AFE braking may be used as first means of retarding the truck. The braking system may meet relevant safety and redundancy standards associated with the autonomous operation.

Suspension

This truck may not have suspension which reduces the number of components, thereby reducing maintenance cost. The tires on the truck may act as suspension due to its spring and limited damping effects. There may be no operator on board the truck. Due to not having an operator, force damping requirements only originate from stability and structural needs.

In a second embodiment, a standard suspension is used.

Tanks

The fuel tank may be designed such that the truck can be operated for 24 hours without refueling.

Auto Lube

With the design inherently removing many of the joints that traditionally need lubrication on a haul truck, an auto lube system may be unnecessary with the use of sealed bushings. Many of the joints rotate a very small amount and very infrequently, making this type of bushing feasible. If deemed necessary, an auto lube system may be hydraulically driven.

Access/Egress/Railings

In embodiments that do not have a cab, there will be no operator entry ladder. There may be one or more service ladders or staircase attached to the legs 34 of the truck. The staircases could come down with the legs 34 of the truck and have handrails as needed. The service ladders or staircases should provide access to the main components of the truck. Walkways will be considered for reaching low interval maintenance areas.

Low Voltage Electrical

An operator interface box may be placed in a position where it is accessible, protected and shielded. The operator interface box may have one or more of: wired remote control interface port, diagnostic port, battery disconnect, propel inhibit, limited hydraulic function in maintenance mode, HMI screen, autonomy function diagnostic, and other required functionality.

Routing of communication cables and other critical signals is designed to have sufficient space to reduce the Electromagnetic Interference (EMI) effect from the high power cables. A 24 VDC charging alternator may be used. A wiring harness may be designed for spray resistance and compatible with spray pressure cleaning.

Payload Weigh System

A separate payload weigh system may be provided. The truck may be equipped with sensors to verify payload mass and position. This information may be provided for controls functionality.

The separate payload weigh system may be provided in embodiments that do not have a suspension and in embodiments having a suspension.

Cab

In an embodiment, there may be no cab in this truck. In particular, as elaborated above, the truck may be autonomous, and may not include a cab for an operator.

The invention claimed is:

1. A self-leveling single axle dump truck comprising:
a frame;
a dump body pivotably mounted on the frame;
a propulsion and self-leveling system comprising:
a single axle supporting the frame at least during motion of the self-leveling single axle dump truck, the single axle comprising at least a first and a second wheel; and
at least a first electric traction motor for driving the first wheel and a second electric traction motor for driving the second wheel.

2. The self-leveling single axle dump truck of claim 1, further comprising: a steering control system configured to control the first electric traction motor and the second electric traction motor and to steer the self-leveling single axle dump truck by wheel speed differentials between the first wheel and the second wheel.

3. The self-leveling single axle dump truck of claim 2, wherein the steering control system is configured to control the first electric traction motor and the second electric traction motor to turn in opposite rotational directions.

4. The self-leveling single axle dump truck of claim 1, further comprising:
a self-leveling control system comprising:
a sensor and
a controller configured to level out the self-leveling single axle dump truck in a balance position by controlling the first electric traction motor and the second electric traction motor in dependence on a signal received from the sensor.

5. The self-leveling single axle dump truck of claim 4, wherein the self-leveling control system is configured to control the first electric traction motor and the second electric traction motor such that the balance position varies in dependence on at least one out of an acceleration of the self-leveling single axle dump truck and a grade of a ground traversed by the self-leveling single axle dump truck.

6. The self-leveling single axle dump truck of claim 1, comprising a control system for controlling the single axle dump truck in an autonomous mode, wherein in the control system is configured to remotely communicate with a central mission controller to receive a mission and to autonomously control the self-leveling single axle dump truck along the mission.

7. The self-leveling single axle dump truck of claim 6, wherein the frame is configured without a cabin for the driver.

8. The self-leveling single axle dump truck of claim 1, further comprising:
support legs arranged on the frame and
at least an actuator for lowering the support legs into at least a first support position where they at least partly support the frame, and for raising the support legs into at least one drive position where the frame is only supported by the single axle.

9. The self-leveling single axle dump truck of claim 8, wherein the actuator is configured to lower the support legs into a second support position where at least one of the first and second wheels of the single axle is lifted off ground.

10. The self-leveling single axle dump truck of claim 8, wherein the at least one actuator comprises a locking bracket for mechanically locking the support legs in at least one support position.

11. The self-leveling single axle dump truck of claim 8, comprising a control system for controlling the at least one actuator, the control system being configured to vary a height position of the support legs during driving.

12. The self-leveling single axle dump truck of claim 11, wherein the control system for controlling the at least one actuator is configured to vary the height position of the support legs in dependence on at least one out of an acceleration of the self-leveling single axle dump truck and a grade of a ground travelled by the self-leveling single axle dump truck.

13. The self-leveling single axle dump truck of claim 11, wherein the control system for controlling the at least one actuator is configured to vary the height position of the support legs to maintain a distance of the support legs with respect to ground to be within a range of allowed distances and/or at an allowed distance.

14. The self-leveling single axle dump truck of claim 8, wherein the support legs are provided with at least one out of caster wheels and leg skids.

15. The self-leveling single axle dump truck of claim 1, further comprising, as a primary power source, at least one out of:
- an internal combustion engine and an alternator driven by the internal combustion engine for generating electrical energy for driving the first electric traction motor and second electric traction motor, and
- a battery for providing electrical energy for driving the first electric traction motor and second electric traction motor.

16. The self-leveling single axle dump truck of claim 15, further comprising:
- an electrical storage system for storing electrical energy to provide extra power the first electric traction motor and second electric traction motor for mass balancing events.

17. The self-leveling single axle dump truck of claim 15, further comprising:
- an energy control system configured to use, in a full power mode, a maximum allowed propulsion power from at least one out of the internal combustion engine and the battery for propulsion of the self-leveling single axle dump truck, and to provide, in the full power mode, extra power for unexpected mass balancing events from at least one out of the electrical storage system and a power reserve of the internal combustion engine and/or the battery.

18. The single axle dump truck of claim 1, further comprising an electrical retarder coupled to the first electrical traction motor and the second electrical traction motor for braking the single axle dump truck in at least a first braking mode, the electrical retarder configured to run an alternator as an engine using electrical energy generated by the first electrical traction motor and the second electrical traction motor, the alternator configured to drive at least one parasitic power consumer of the single axle dump truck during braking.

19. The single axle dump truck of claim 1, wherein wheel bearings of the first and second wheel are rigidly mounted on the frame.

20. The self-leveling single axle dump truck of claim 19, wherein the first electrical traction motor and the second electrical traction motor are each rigidly mounted on the frame, and the first wheel is rigidly mounted on an output shaft of the first electrical traction motor or an output shaft of a first gearing rigidly mounted on at least one out of the frame and the first electrical traction motor; and wherein the second wheel is rigidly mounted on an output shaft of the second electrical traction motor or an output shaft of a second gearing rigidly mounted on at least one out of the frame and the second electrical traction motor.

21. The single axle dump truck of claim 1, wherein wheel bearings of the first and second wheel are mounted on the frame via a suspension.

22. The self-leveling single axle dump truck of claim 1, further comprising a remote controller for controlling the single axle dump truck, the remote controller allowing full loading and unloading control and limited propel control.

23. The self-leveling single axle dump truck of claim 1, further comprising a towing receptacle for towing the single axle dump truck.

24. A self-leveling single axle load truck comprising:
a frame;
a load carrier mounted on the frame;
a propulsion and self-leveling system comprising:
- a single axle supporting the frame at least during motion of the self-leveling single axle dump truck, the single axle comprising at least a first and a second wheel; and
- at least a first electric traction motor for driving the first wheel and a second electric traction motor for driving the second wheel;
support legs arranged on the frame and
at least an actuator for lowering the support legs into at least a first support position where they at least partly support the frame, and for raising the support legs into at least one drive position where the frame is only supported by the single axle.

25. A method for operating a self-leveling single axle dump truck, the self-leveling single axle dump truck comprising a frame, a dump body pivotably mounted on the frame and a propulsion and self-leveling system comprising a single axle supporting the frame at least during motion of the self-leveling single axle dump truck, the single axle comprising at least a first and a second wheel, and at least a first electric traction motor for driving the first wheel and a second electric traction motor for driving the second wheel, the method comprising:
- driving the self-leveling single axle dump truck by controlling the first electric traction motor and the second electric traction motor to generate a driving torque;
- during the driving of the self-leveling single axle dump truck, self-leveling the self-leveling single axle dump truck by generating a self-leveling torque that is combined with the driving torque; and
- during the driving of the self-leveling single axle dump truck, steering the self-leveling single axle dump truck by controlling the first electric traction motor and the second electric traction motor to generate wheel speed differentials between the first wheel and the second wheel.

26. The method of claim 25, further comprising:
stopping the self-leveling single axle dump truck;
lowering support legs into at least one support position where they at least partly support the frame, and
at least one out of loading the self-leveling single axle dump truck by filling the dump body and un-loading the self-leveling single axle dump truck by hoisting the dump body.

27. The method of claim 25, further comprising:
driving the self-leveling single axle dump truck in a first driving direction from a loading position or a dump position of a dump mission to the remaining one of the loading position or the dump position by controlling the first electric traction motor and the second electric traction motor to rotate in a first angular direction;
stopping the self-leveling single axle dump truck;
loading the self-leveling single axle dump truck by filling the dump body or un-loading the self-leveling single axle dump truck by hoisting the dump body; and
without turning around, driving the self-leveling single axle dump truck back to a dump position or a loading position in a second driving direction opposite to the first driving direction by controlling the first electric traction motor and the second electric traction motor to rotate in a second angular direction opposite to the first angular direction.

28. The method of claim 25, performed by a control system of the self-leveling single axle dump truck, the method further comprising:
 receiving a mission from a central mission controller; and
 autonomously controlling the self-leveling single axle dump truck along the mission.

29. The method of claim 28, further comprising:
 manually controlling the self-leveling single axle dump truck using a remote controller.

* * * * *